(12) United States Patent
Rumph et al.

(10) Patent No.: US 6,302,522 B1
(45) Date of Patent: Oct. 16, 2001

(54) PERFORMANCE OPTIMIZATION OF MONOCHROME PAGES IN A COLOR PRINTING SYSTEM

(75) Inventors: David E. Rumph, Pasadena; Terry C. Wells, Long Beach; Susan Evans, California City, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/569,638

(22) Filed: May 12, 2000

(51) Int. Cl.$^7$ ........................................ B41J 2/21
(52) U.S. Cl. .................................................. 347/43
(58) Field of Search ............... 347/43; 358/1.1, 358/1.9, 1.4

(56) References Cited

U.S. PATENT DOCUMENTS 5,923,821 * 7/1999 Birnbaum et al. .................. 358/1.9
6,262,747 * 7/2001 Rocheleau et al. ................. 345/620

* cited by examiner

*Primary Examiner*—Thinh Nguyen
(74) *Attorney, Agent, or Firm*—Philip T. Virga

(57) ABSTRACT

A method of determining whether a page to be printed on a color printer will actually be entirely printed in one colorant, usually black, and if so, automatically omitting whatever processing steps are unnecessary as a result. Determining if the page is monochrome can be done either by (1) including a signal in the PDL or by a signal from the user or by (2) inspecting each element of the page to determine if all elements are specified to be printed in the same one colorant. If either is true, then various color operations such as trapping, color conversion to any other color, and color correction for non-selected colors can be automatically omitted.

8 Claims, No Drawings

PERFORMANCE OPTIMIZATION OF MONOCHROME PAGES IN A COLOR PRINTING SYSTEM

BACKGROUND OF THE INVENTION

Preparing color pages expressed in a Page Description Language (PDL) such as PostScript for printing is more time-consuming than for the equivalent black-and-white system. Some of the additional time spent is simply preparing more color planes. Additional operations to resolve interactions between color planes, such as overprinting and trapping, also add to the processing time. Prior to this invention, color printing systems simply took longer when processing monochrome pages. In some cases the user was required to manually disable additional operations when pages were known to be monochrome.

An automated method for deciding how to process a page optimally was needed.

SUMMARY OF THE INVENTION

Many modern color printing controllers produce full-color contone output with a sophisticated range of features such as trapping and black overprint. However, these digital front ends (DFEs) will also see monochrome (i.e., black and white) pages with considerable frequency. Often they will be intermixed in a document that also includes pages containing color. At other times, the user will want to print an otherwise color document only in gray tones.

When Raster Image Processing (RIP) a document in a page description language, it is first converted to a display list. Processing efficiencies can be had if objects are known to be monochrome. This invention detects whether objects are monochrome, usually black or a tint of black, but any other single colorant such as cyan magenta or yellow are possible, and if so, adds achromatic tags to the monochrome elements in the display list. When an achromatic tag is encountered during rendering, less data and simpler operations (e.g., no trapping) are invoked. An achromatic tag is generated several ways during list generation. If a user requests a document to be printed in monochrome, the achromatic tag is attached to all objects. Otherwise, objects in the display list are analyzed and are tagged appropriately. There are three classes of objects: (1) constant color objects; (2) smooth-shading objects which have colors given as a function of position by a formula; and (3) image objects, all of which can be determined by either the individual colors or the color space specified in the PDL. This invention provides significant improvement for a print path, increasing throughput with no decrease in image quality.

The following describes some opportunities to improve RIP performance when dealing with monochrome jobs, including their potential for improvement and their cost. Two cases are considered: (1) a page is determined to be monochrome in the course of processing it, and (2) a job or page is known or forced to be monochrome at the beginning of processing. Processing steps that can be eliminated for monochrome pages are also identified.

DETAILED DESCRIPTION OF THE INVENTION

Many modern PDL decomposers process each page in two phases, PDL interpretation/display list generation (or object collection), and display list rendering. A page can be determined to be monochrome and an achromatic flag can be set in either phase. The knowledge that a page is monochrome can be used to eliminate or abbreviate processing steps in both of these phases.

Interpretation basically breaks the input PDL data into a small number of different types of graphical objects, or elements, including fonts, graphics, images and smooth shading. For our purposes, it is sufficient to categorize these objects into three groups, those of constant color, smooth shading and raster images.

For constant color objects, the time spent processing constant color objects is almost completely dominated by processing the shape data. There is no opportunity to improve any time spent in this area. However, it is easy and valuable to maintain an achromatic flag in the context data indicating that all the objects collected thus far are in fact monochrome. This is done by looking at the components of the color to determine if the color is neutral. For example, in the case of cyan, magenta, yellow, black, (CYMK), C, M and Y all being 0 denotes a neutral (white-gray-black) color. Another example is for one of C, Y, or M to be a non-zero number and the remaining three to be zero, in which case the color would be monochrome in a C, M or Y colorant. In the alternative, other color spaces have similar ways to determine whether a color is monochromal.

The colors of smooth shading objects are often represented parametrically, and the colors of individual pixels are calculated as needed. It is easy and fast to determine whether or not a particular smooth shading object can produce non-neutral colors: if the initial color is neutral and the color difference deltas cannot pull it off neutral, the smooth shading object must be entirely neutral. For example, if all the separations of the initial color in an RGB space were equal, and the deltas were all equal, no chromatic colors can be produced.

For images, considerable effort is expended dealing with the color data. Therefore, elimination of work when processing chromatic separations (like C, M and Y in a CMYK space) represents a significant opportunity to increase performance. It is impractical to maintain the aforementioned achromatic flag by looking at every color of every pixel in an image. However, it is common for the pixels of an image to represent colors with respect to a "color space" or "color operator". This associated color space can be used to determine whether or not an image is capable of having non-neutral colors. (Note that this does not address the case where an image specified in a color-capable color space actually contains no non-neutral colors. That case is too costly to detect to be worthwhile addressing.) The chromatic capability of the color space is interrogated when each image is collected to update the achromatic flag.

One more useful user option can be described as "force black", or "force achromatic". When this option is selected in any way, including an instruction in the PDL or by the printer operator, the achromatic flag for the page is set.

Once the flag is set, a number of operations can be bypassed.

During display list generation, for images, several time consuming operations can be eliminated in the achromatic case:

a. Avoiding resampling (that is, the combination of rotation and scaling) of chromatic separations (such as C, M and Y in the case of CMYK);

b. For black overprinting, avoiding clearing the chromatic (e.g. C, M & Y) separations of the full-page image buffer since these locations will not be written into;

c. Do color conversions only into the achromatic (e.g. K or L) separation, ignoring C, M and Y.

By the time all display list objects are collected the context's achromatic flag will be determined. The value of the achromatic flag is used to control how subsequent rendering is done.

Processing for black (monochrome) overprint in all forms can be completely disabled if achromatic is true. This includes not clearing the other color separations when loading black.

Trapping is disabled if the achromatic flag is set since trapping is to compensate for a misregistration between two or more colors.

For Format Generation/Compression, some PDL decomposers include format generators that produce output particularly suitable for specific marking systems, often involving compression. These format generators provide an abundance of places where work can be avoided if it is known that only neutral colors will be seen.

a. don't apply any IOT-specific processing, such as modifying halftone choices or applying 1-dimensional lookup tables, to C, M and Y;

b. when the format generator uses run-length compression, represent the entire scanlines worth of C, M & Y as single white runs, even if they purport to contain image data (which is known to be all white). This avoids considerable compression overhead;

c. don't compress non-neutral separations, but instead use a precompressed white separation of the appropriate page size.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of rendering a page of image elements described in a PDL for printing on a color printer that is capable of printing using two or more colorants comprising the steps of:

determining that all elements of the area are to be printed in one colorant, selecting that one colorant, and rendering the page by:

a) doing color conversion only into the selected one colorant, or b) disabling trapping, or c) disabling clearing the other colorant in the process of overprinting.

2. A method of rendering a page of image elements described in a PDL for printing on a color printer that is capable of printing using two or more colorants comprising the steps of:

using a signal to indicate that all elements of the area are to be printed in one colorant, selecting that one colorant, and rendering the page by:

a) doing color conversion only into the selected one colorant, or b) disabling trapping, or c) disabling clearing the other colorant in the process of overprinting.

3. The method of claim 2 wherein the signal is contained in the PDL.

4. A method of rendering a page of image elements described in a PDL for printing on a color printer that is capable of printing using two or more colorants comprising the steps of:

inspecting all elements on the page and setting a flag if all elements on the page are described in the PDL as being limited to only one colorant, and selecting that one colorant, and if the flag is set, a) doing color conversion only into the selected one colorant, or b) disabling trapping, or c) disabling clearing the other colorant in the process of overprinting.

5. The method of claim 4 wherein the inspecting step comprises:

for constant color, inspecting the element to determine if only the one colorant is specified, or for smooth shading, inspecting the element to determine if all shades of the element are capable of being produced by the one colorant, or for an image, inspecting the element to determine if the color space is limited to the one colorant.

6. A method of printing an element of a page described in a PDL on a color printer that is capable of printing using two or more colorants comprising the steps of:

inspecting a current element and setting a flag if the current element and all previous elements on the page are described as being in one colorant, and selecting that one colorant, and if the flag is set, rendering the element by:

a) doing color conversion only into the selected colorant, or b) disabling trapping, or c) disabling clearing the other colorant in the case of overprinting in the one colorant.

7. The method of claim 6 wherein the inspecting step comprises:

for constant color, inspecting the element to determine if only the one colorant is specified, or for smooth shading, inspecting the element to determine if all shades of the element are capable of being produced by the one colorant, or for an image, inspecting the element to determine if the color space is limited to the one colorant.

8. The method of claims 1, 2, 4 and 6 wherein the one colorant is black.

\* \* \* \* \*